US009088425B2

(12) United States Patent
Rao et al.

(10) Patent No.: US 9,088,425 B2
(45) Date of Patent: Jul. 21, 2015

(54) METHOD AND APPARATUS FOR COLLABORATION AMONG INDIVIDUALS

(75) Inventors: Alok S. Raghunath Rao, Nagpur (IN); Ashok K. Meena, Rajasthan (IN); Raju T. Ramakrishnan, Bangalore (IN); Ramakrishnan R. Sankaranarayan, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1714 days.

(21) Appl. No.: 11/505,281

(22) Filed: Aug. 17, 2006

(65) Prior Publication Data

US 2007/0260687 A1 Nov. 8, 2007

(30) Foreign Application Priority Data

May 4, 2006 (IN) .............................. 628/CHE/2006

(51) Int. Cl.
*A63F 13/30* (2014.01)
*H04L 12/58* (2006.01)
*H04L 12/18* (2006.01)
*H04L 29/06* (2006.01)

(52) U.S. Cl.
CPC ............ *H04L 12/1827* (2013.01); *A63F 13/12* (2013.01); *A63F 2300/406* (2013.01); *A63F 2300/407* (2013.01); *A63F 2300/5566* (2013.01); *A63F 2300/572* (2013.01); *A63F 2300/69* (2013.01); *H04L 51/14* (2013.01); *H04L 67/38* (2013.01)

(58) Field of Classification Search
CPC .... H04M 7/003; H04M 7/0024; H04L 67/38; H04L 51/14; A63F 2300/40; A63F 2300/403; A63F 2300/404; A63F 2300/406; A63F 2300/407; A63F 2300/5553; A63F 2300/5546; A63F 2300/58; A63F 2300/69; A63F 13/12
USPC .......................................... 463/30–35, 40–42
See application file for complete search history.

(56) References Cited

U.S. PATENT DOCUMENTS

| | | | |
|---|---|---|---|
| 6,789,120 B1 | 9/2004 | Lee | |
| 6,839,417 B2 | 1/2005 | Weisman | |
| 6,848,997 B1 | 2/2005 | Hashimoto | |
| 6,862,277 B2 | 3/2005 | Pan | |
| 7,086,005 B1 * | 8/2006 | Matsuda | 715/706 |
| 2003/0055984 A1 * | 3/2003 | Shimakawa et al. | 709/227 |
| 2004/0109023 A1 * | 6/2004 | Tsuchiya | 345/758 |
| 2004/0235520 A1 * | 11/2004 | Cadiz et al. | 455/557 |
| 2005/0004984 A1 * | 1/2005 | Simpson | 709/205 |
| 2006/0224681 A1 * | 10/2006 | Wurster | 709/206 |
| 2007/0111796 A1 * | 5/2007 | C. Giaimo et al. | 463/42 |

OTHER PUBLICATIONS

Kelly Murdock, Playstation 3:Beyond the Box Mar. 27, 2006.

* cited by examiner

*Primary Examiner* — Werner Garner

(57) ABSTRACT

Method and systems for establishing a collaboration among individuals and an imaginary character in a virtual world are disclosed. An exemplary method may include establishing an internet protocol channel between a first individual and a program represented by the imaginary character. The exemplary method may also include establishing a non-internet protocol channel between a second individual and the program represented by the imaginary character.

20 Claims, 6 Drawing Sheets

METHOD AND APPARATUS FOR COLLABORATION AMONG INDIVIDUALS

RELATED APPLICATION

This application is based upon and claims the benefit of priority from the prior Indian Patent Application No. 628/Che/2006, filed on Apr. 5, 2006, the entire contents of which are incorporated herein by reference.

BACKGROUND INFORMATION

Individuals may choose among several modes of communication, but using voice communications is often most effective. For instance, communication via voice has several advantages over other modes of communication with respect to vocabularies, expression, and speed. In addition, when individuals communicate face to face their expressions often convey much more than the words they speak. Emotions, for example, are easily conveyed using expressions. The conciseness of an individual's grin, fright, frustration on the face, or grunt (Uh? Uhuh. Ew! Hmm. Ow!) interjected into a conversation can let the other individuals who collaborate in the conversation know a lot about the effect of the conversation on that individual's emotions. Disagreement, astonishment, and frustration can suggest where a conversation could be heading.

In a standard, two-peer telephone call, all the facilities of voice communication are available. This is one reason why telephone use has penetrated into most households. In fact, many households have two or more lines. With cellular technology getting cheaper everyday, many people in every age group carry a mobile telephone with them everywhere to be connected to the world wherever they go, using telephones only. However, one important element of effective communication is still missing—the ability to see another person while talking to him or her.

Computer gaming and virtual reality has increased in popularity with individuals often spending many hours in a virtual world (i.e., a world having no physical existence but existing purely in electronic form and created by hardware and/or software of a computer) playing games or simulations. Communications among individuals playing such games is mainly achieved via voice or text mode using a client/server model in which the individuals act as clients and communicate with each other. Using this mode of communication a person engaged in the virtual world is unable to communicate with an individual outside (i.e., not playing) the game. In other words, there is no communication link from the virtual world to the real world and vice versa. Moreover, an individual playing a virtual world game may receive a call. Since the individual is busy playing a game, his answering machine may take the call or he may pause the game to receive the call. Otherwise, the call will be missed.

Conferencing is a very common approach for communication in multiplayer games. The plurality of players in the game makes the game appealing to the participating individuals. In multiplayer games, communication between the participating individuals is often accomplished with a client/server based system, such as VoIP. However, a client/server based system, such as VoIP, does not allow individuals who are not playing the game to get involved in or be exposed to the game.

DETAILED DESCRIPTION OF PREFERRED EMBODIMENTS

In systems and methods consistent with certain embodiments of the present invention, one or more individuals in a virtual world may collaborate with each other and with one or more individuals in the real world using text, audio, video, and/or images. Individuals in the virtual world may include imaginary characters controlled, for example, by interactive and/or prerecorded programs. The imaginary characters may also be controlled, optionally or in part, by individuals in the real world. Moreover, an individual participating in the virtual world (e.g., playing an on-line game) may receive a notification of an incoming call at a compatible output device. The individual may, therefore, answer the call without interrupting his/her participation in the virtual world. Moreover, the caller may be invited to participate in the game through an interaction with the one or more imaginary characters in the virtual world.

Reference will now be made in detail to exemplary embodiments of the present invention, examples of which are illustrated in the accompanying drawings. Wherever possible, the same reference numbers will be used throughout the Figures to refer to the same or like elements. The accompanying Figures illustrate certain exemplary embodiments and implementations consistent with the present invention, but the description of those embodiments does not indicate or imply that other embodiments or implementations do not fall within the scope of present invention (which is defined by the appended claims). It is to be understood that other implementations may be utilized and that structural and method changes may be made without departing from the scope of present invention.

Figure 1:
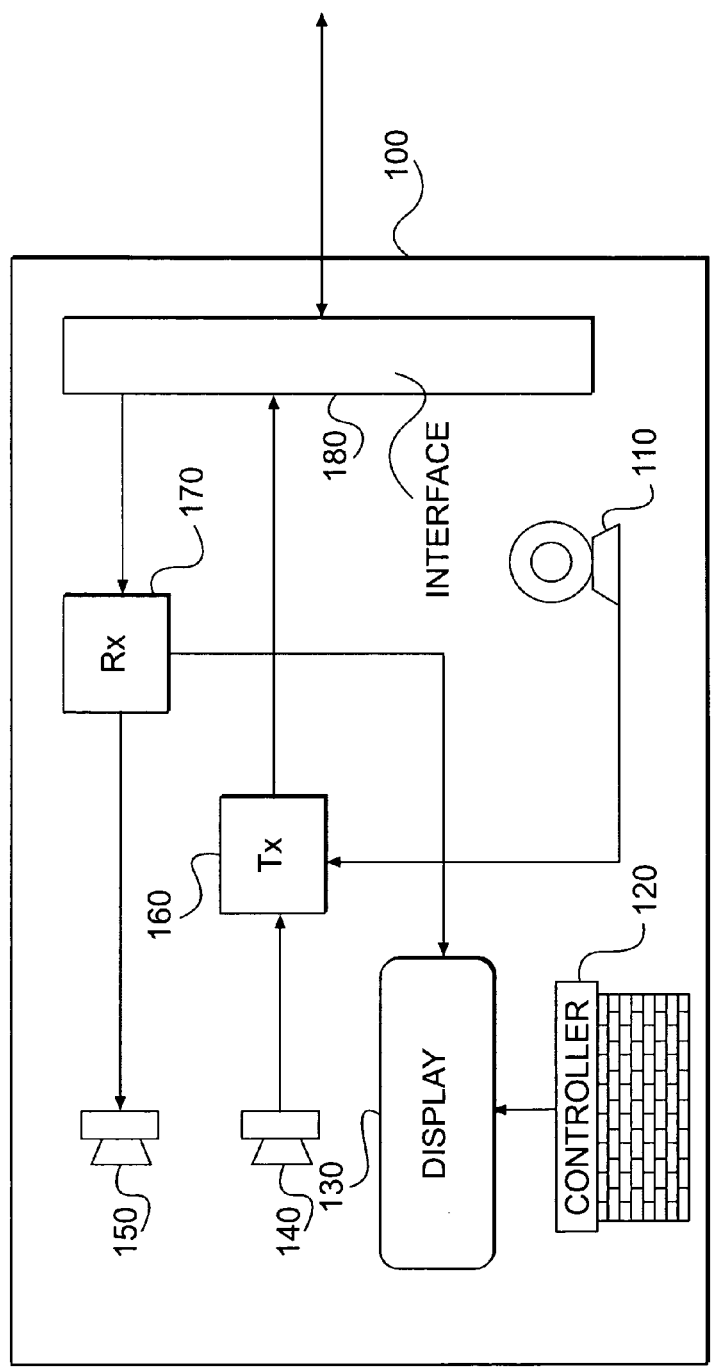
FIG. 1 is a block diagram of an exemplary embodiment of a user terminal.

FIG. 1 depicts a preferred embodiment of an exemplary user terminal 100. User terminal 100 may be a communications device, such as a PSTN phone or a cellular phone, and may include an image input device 110, a keypad 120, a display 130, an audio input device 140, an audio output device 150, a transmit buffer 160, a receive buffer 170, and a communications interface 180. Communications interface 180 may provide communications with a channel over a network. Communications interface 180 may include a device for implementing an Internet Protocol (IP) channel, such as a Voice over IP (VoIP) phone or a software phone capable of transmitting voice over TCP or UDP over an IP-based communication channel. Communications interface 180 may also include a device for establishing a channel in a non-IP-based communication network, such as a Public Switched Telephone Network (PSTN), Code Division Multiple Access (CDMA) or Global System for Mobile (GSM) wireless network, or similar non-IP-based communication network.

Receive buffer 170 may serve as a common buffer for various forms of media received via communications interface 180. For example, receive buffer 170 may store information received in the form of video, audio, and/or text to be processed and/or displayed. Incoming audio streams stored by receive buffer 170 may be passed on to an output device 150, such as a multimedia speaker or headphones connected to a personal computer or gaming console attached to or integral with user terminal 100. The gaming console may be connected to a display or may be a portable gaming console with an embedded display. Video or text streams stored by receive buffer 170 may be displayed on display 130. Keypad 120 may be a typical alphanumeric keypad for receiving text or control commands from a user and may include special function buttons for specific commands. Audio input device 140 may be a microphone and may receive voice input or voice commands. Image input device 110 may be a camera (e.g., a CMOS, CCD, or similar device) capable of recording still pictures or motion video input. Transmit buffer 160 may store communications streams (e.g., audio, text, and/or video streams) received from keypad 120, audio input device 140, and image input device 110. Transmit buffer 160 may transmit the communications streams via communications interface 180. Communications streams may be transmitted from transmit buffer 160 individually or any combination of two or three data streams simultaneously.

Figure 2:
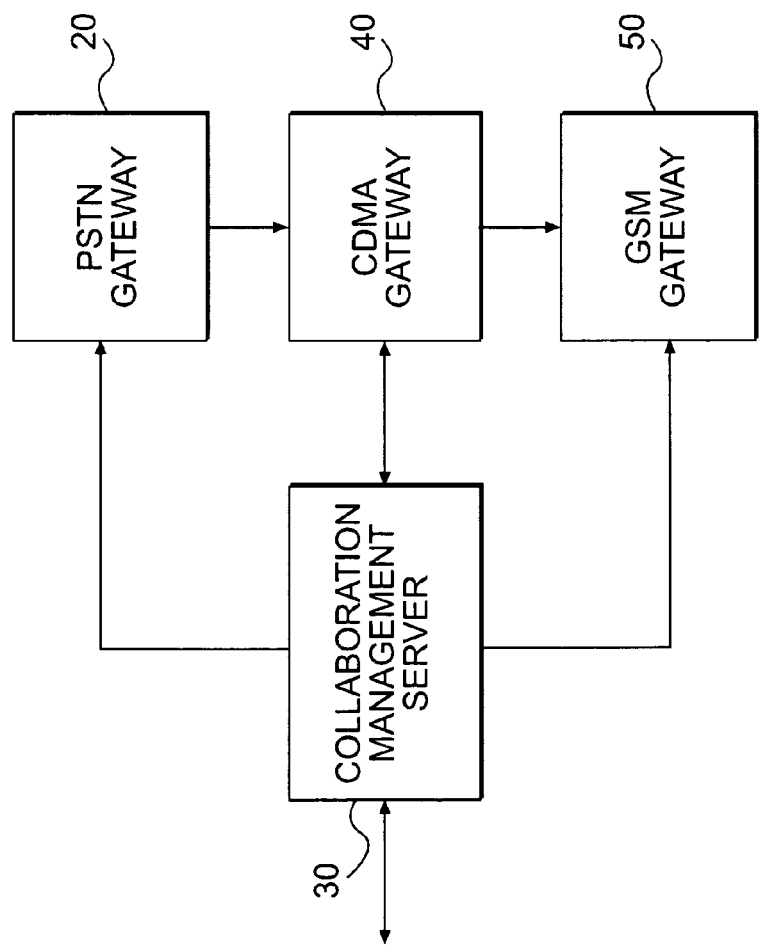
FIG. 2 is block diagram of a system including one embodiment of a collaboration management server configured to communicate with a plurality of gateways.

FIG. 2 depicts a media switching system that allows a plurality of communication media to function together (i.e., communications over heterogeneous communication networks). Collaboration management server 30 may serve as a clearinghouse for heterogeneous networks. As such, collaboration management server 30 may be connected to an IP-based communications network and to gateways for various non-IP-based networks. For example, collaboration management server 30 may support a PSTN gateway 20, a CDMA gateway 40, a GSM gateway 50, and other non-IP communication media gateways not shown in FIG. 2.

Collaboration management server 30 may also serve as a control center for managing collaborations among individuals using various communication media. For example, a collaboration could be a conference call including one or more means of communication such as text, audio, video, and images. A collaboration initiator may be an individual in the real world, an individual with an alias in a virtual world, or a program represented by an imaginary character (i.e., an imaginary individual) in the virtual world. Collaboration management server 30 may manage collaborations between individuals in the real world and imaginary characters in the virtual world. An imaginary character in the virtual world may be a prerecorded or an interactive program designed to converse intelligently with real world individuals to provide them with information. The program may be autonomous and may be adapted to display a character with its own voice, video, and text capabilities. Moreover, the virtual world in which the imaginary character "exists" may be a world that does not have a physical existence and exists purely in electronic form.

Collaboration management server 30 may maintain records for keeping track of an individual's preferred user terminal (e.g., a user terminal in use or designated as preferred by the individual) and may divert incoming calls to the preferred user terminal. A preferred user terminal may be, for example, a computer, a PSTN phone, or a mobile phone equipped with voice and/or video abilities. The Collaboration Management Server may also include means and methods for managing calls.

Figure 3:
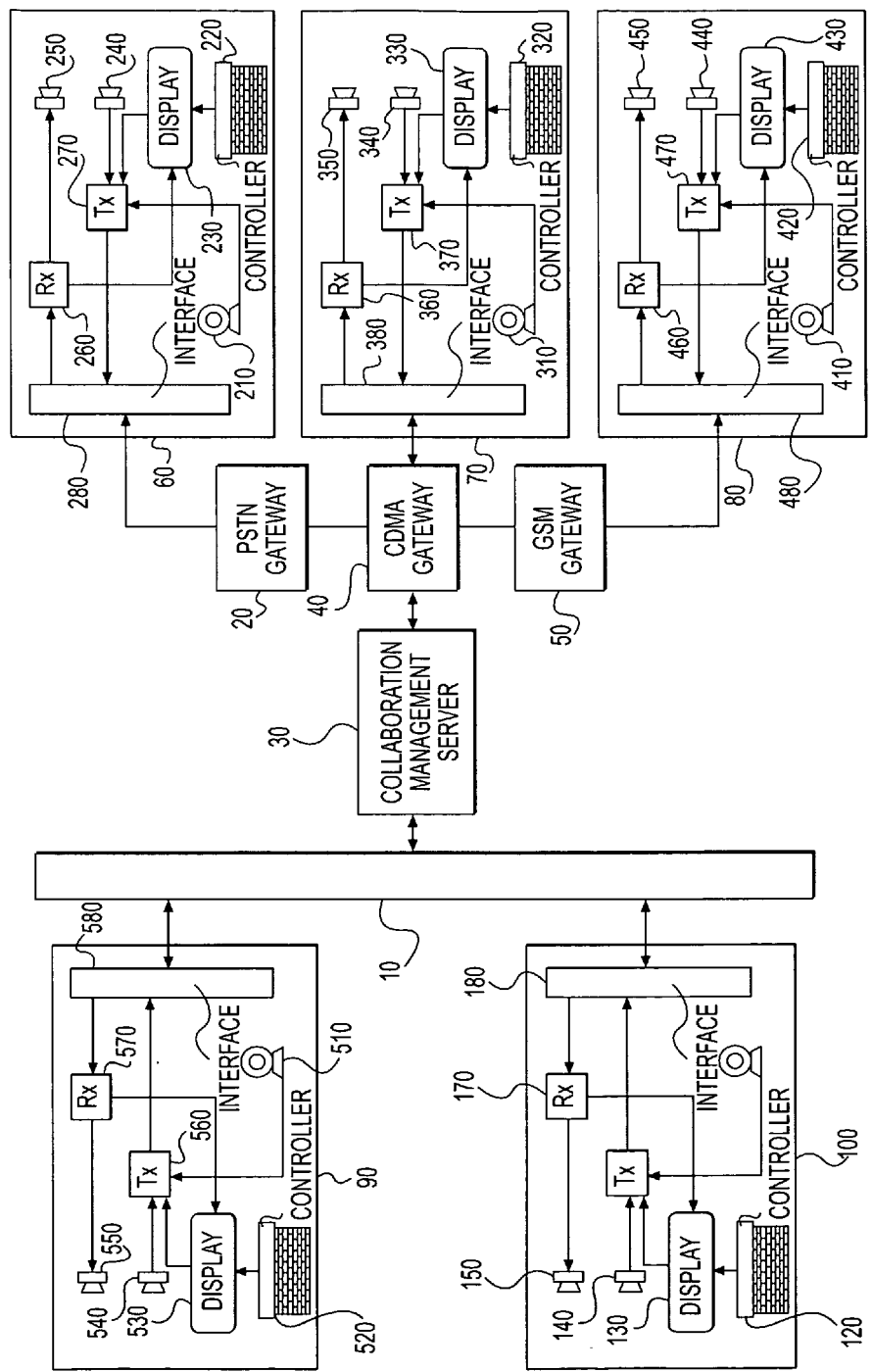
FIG. 3 is a block diagram of a system including one embodiment of a collaboration management server in communication with multiple user terminals configured to participate in a collaboration over heterogeneous communications channels.

FIG. 3 is a block diagram of a preferred system including collaboration management server 30 in communication with multiple user terminals 60, 70, 80, 90, and 100 configured to participate in collaborations over heterogeneous communications channels. Communications channel 10 may include an IP-based network such as a local or wide area Ethernet, the Internet, or any other IP-based communications medium or combination thereof. If communications channel 10 is the Internet, collaboration management server 30 may transfer voice and data over communications channel 10 using UDP or TCP connections.

Collaboration management server 30 may also transfer voice and data over non-IP-based networks. As described above with respect to FIG. 2, collaboration management server 30 may switch connections to respective networks on the request of the caller to gateways 20, 40, and 50. Collaboration management server 30 may include, for example, a modem compliant with the International Telecommunications Union V.70 specification, which can simultaneously carry both data and digitally encoded voice signals over a single dial-up phone line. Collaboration management server 30 may also include software APIs, such as the DirectPlay and DirectVoice elements of DirectX 8.1 by Microsoft Corporation of Redmond, Wash., which permit channels normally configured for data only to incorporate simultaneous digitized voice transmissions. In addition, collaboration management server 30 may include a wireless solution for simultaneously transferring voice and data over a wireless channel normally used for voice communication only.

User terminals 60, 70, 80, 90, and 100 may interface with collaboration management server 30. User terminals 90 and 100, in particular, may be implemented using any device capable of communicating over an IP channel (e.g., a Voice over IP (VoIP) channel) of a homogeneous IP-based network. For example, user terminals 90 and 100 may be general purpose computers or personal computers equipped with modems. User terminals 90 and 100 may also be implemented in other devices, such as the Blackberry™ and Ergo Audrey™. User terminals 90 and 100 may include components designed for interfacing with an individual (e.g., image input devices 510 and 110, keypads 520 and 120, displays 530 and 130, audio input devices 540 and 140, and audio output devices 550 and 150). Alternatively, one or both of user terminals 90 and 100 may represent imaginary characters in a virtual world capable of communicating over an IP channel.

User terminals 60, 70, and 80 may be implemented using voice, video, image, and text enabled telephone and wireless phone devices, such as pagers, mobile phones, and Personal Digital Assistants ("PDA"). User terminals 60, 70, and 80 may be capable of providing one or more communication capabilities (e.g., text, voice, video, and image). Collaboration in a conference, peer to peer call, or on-line game may be possible regardless of whether a particular communication capability (e.g., text, voice, video, and image) is unavailable in an individual user terminal. For example, if a user terminal lacks video and image transfer capability an associated individual may collaborate using text and/or voice in a collaboration with other individuals who may be collaborating using video, audio, and text.

Consider a scenario in which an individual operating user terminal 60 wishes to collaborate in audio, video, and text mode with other individuals operating user terminals 70 and 100. User terminal 60 may initiate a collaboration by transmitting invitations to collaboration management server 30, which may route the invitations to user terminals 70 and 100. User terminals 70 and 100 may display the invitations and individuals operating user terminals 70 and 100 may accept, deny, or ignore the invitations. An invitation may contain an encrypted key to act as a password for joining the collaboration. The collaboration may be in session once one or more individuals join.

During a collaboration in which user terminal 60 participates, video data from image input device 210, audio data from audio input device 240, and text data messages from keypad 220 may be stored in transmit buffer 270 as separate data streams. Transmit buffer 270 may pass the separate streams to communications interface 280, which may pass them to gateway 20. Gateway 20 may encode the voice, video, and text streams into IP-based UDP and/or TCP connections. For example, video streams may be encoded using RTP, RTSP, or similar video transmitting protocols. Audio streams may be converted using VoIP-related protocols to support voice transmission over an IP communication channel. Collaboration management server 30 may route data streams (e.g., voice, video, and text) to and from user terminal 60.

User terminal 70 may perform similar operations by passing video data from image input device 310, audio data from audio input device 340, and text data messages from keypad 320 to transmit buffer 370 as separate data streams. Transmit buffer 370 may pass the separate streams to communications interface 380, which may pass them to gateway 40. Gateway 40 may encode the voice, video, and text streams into IP-based UDP and/or TCP connections. Corresponding components of user terminal 100 may also perform similar operations at the same time. Collaboration management server 30 may route a data stream (comprising text, audio, and video data streams) transmitted by user terminal 100 to gateways 20 and 40 or other gateways, as directed by user terminal 100. Gateways 20 and 40 may convert the data stream from user terminal 100 into separate voice and data channels to be transmitted over the respective networks of user terminals 60 and 70. In this manner, a connection from within a virtual world may be established among two individuals, operating user terminals 60 and 70, and one individual, operating user terminal 100.

In addition, a fourth individual operating user terminal 80 may be invited to join the collaboration. If user terminal 80 lacks video capability, collaboration management server 30 may detect or receive an indication of the inability to provide video stream and may transmit audio and/or text streams from user terminal 80 to user terminals 60, 70, and 100. If user terminal 80 is also unable to display the incoming video feeds, then collaboration management server 30 may detect or receive an indication of that, too. Using the detected or indicated information regarding the capabilities of user terminals, collaboration management server 30 may ensure that user terminals receive the data streams that they have the capability to display.

In certain embodiments, one or both of user terminals 90 and 100 may include gaming consoles. In a configuration such as this, communications interfaces 180 and 580 may include Network Interface Cards (NICs). A first individual operating user terminal 90 may collaborate as a teammate with a second individual in an on-line game (e.g., a Massively Multiplayer Online Game (MMOG)). The second individual may be operating user terminal 70, for example. An imaginary character in the on-line game, which is not shown in FIG. 3 but could be represented by user terminal 100, may initiate a call to the first individual at user terminal 90. The imaginary character may provide information related to the on-line game and may advise the first individual to share the information with his or her teammate at user terminal 70. For example, the first individual at user terminal 90 or the imaginary character may cause an invitation to be sent to the second individual at user terminal 70 to join in a collaboration. The second individual at user terminal 70 may join the collaboration with the first individual and the imaginary character once he receives the invitation. Thus, the imaginary character and the individuals at user terminals 70 and 90 may participate in a collaboration and the imaginary character may transmit critical information regarding further game play.

During the collaboration between the imaginary character and the individuals at user terminals 70 and 90, a third individual operating user terminal 80 may wish to contact the first individual at user terminal 90 to have a discussion regarding a subject unrelated to the on-line game. Moreover, user terminal 60 may be a phone belonging to the first individual operating user terminal 90, user terminal 80 may be a phone, and user terminal 90 may include a gaming console. Thus, the third individual may call phone 60 while the first individual is playing the on-line game with user terminal 90. Instead of letting an answering machine answer the call from the third individual at user terminal 80, phone 60 may be configured to route the call to a compatible output device (e.g., a gaming headset) attached to user terminal 90. User terminal 90 may be equipped to allow the first individual to carry on a conversation with the third individual at user terminal 80 without interrupting or being interrupted by the collaboration with the imaginary character and the second individual at user terminal 70. For example, user terminal 90 may be equipped with a parallel channel capability to allow the first individual to lower the volume or mute signals received from the collaboration.

User terminal 90 may also be equipped to allow the first individual to mute an outgoing signal to the collaboration while carrying on a side conversation with the third individual. Meanwhile, a visual notification, such as "busy" or "be right back," may be provided to the second individual at user terminal 70 indicating the status of the first individual. Thus, the first individual at user terminal 90 may take an important call while participating in a collaboration in a virtual world of an on-line game.

In a case where a collaboration is not being conducted but the first individual at user terminal 90 is using a gaming headset, the first individual need not initialize a parallel channel for communication but may simply answer the call routed to the gaming headset while playing in the virtual world. Thus, individuals playing a game in the virtual world may have an uninterrupted virtual gaming experience. While the above scenario has been described for a collaboration among two individuals and an imaginary character, similar methods and systems may be applied to collaborations involving more than two individuals and/or no imaginary characters.

Figure 4:
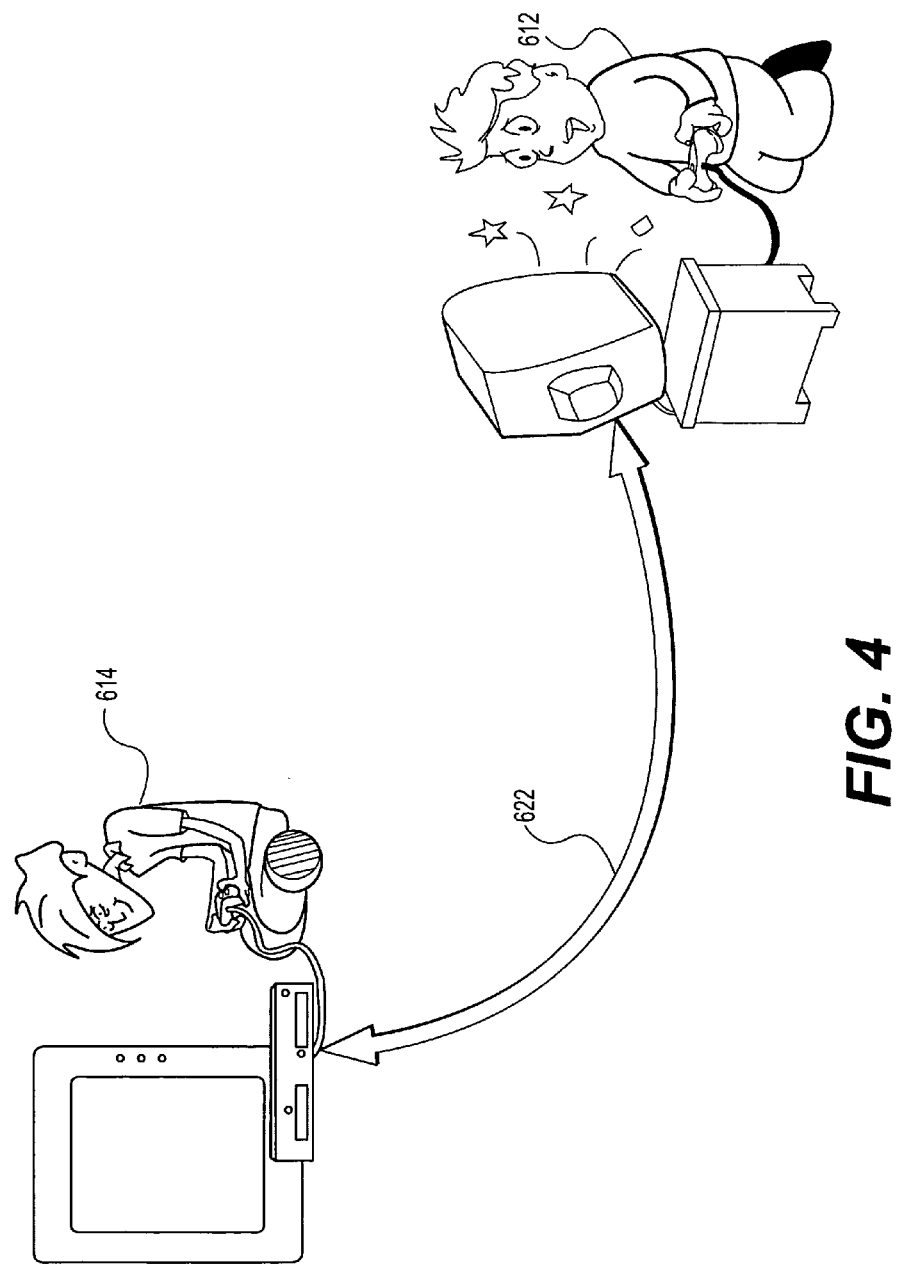
FIG. 4 depicts one embodiment of a system in operation to conduct a collaboration from within a virtual world.

FIG. 4 depicts one embodiment in which two individuals 612 and 614 are interacting with a virtual world (e.g., a game world) via their respective user terminals (e.g., game consoles). Individuals 612 and 614 may each be represented by an imaginary character (e.g., a graphic) playing a role within the virtual world. Individuals 612 and 614 may control their respective imaginary characters in the virtual world and may perceive one another as imaginary characters in the virtual world. Thus, for simplicity, individuals 612 and 614 may be referred to as virtual world individuals. In addition to, or as a function of, their roles in the virtual world, individuals 612 and 614 may collaborate with each other via, for example, a conference call, in the virtual world. A communication line 622 for supporting the conference call may be a purely homogeneous communication medium and may allow only IP-based communication, typically a broadband internet connection.

Figure 5:
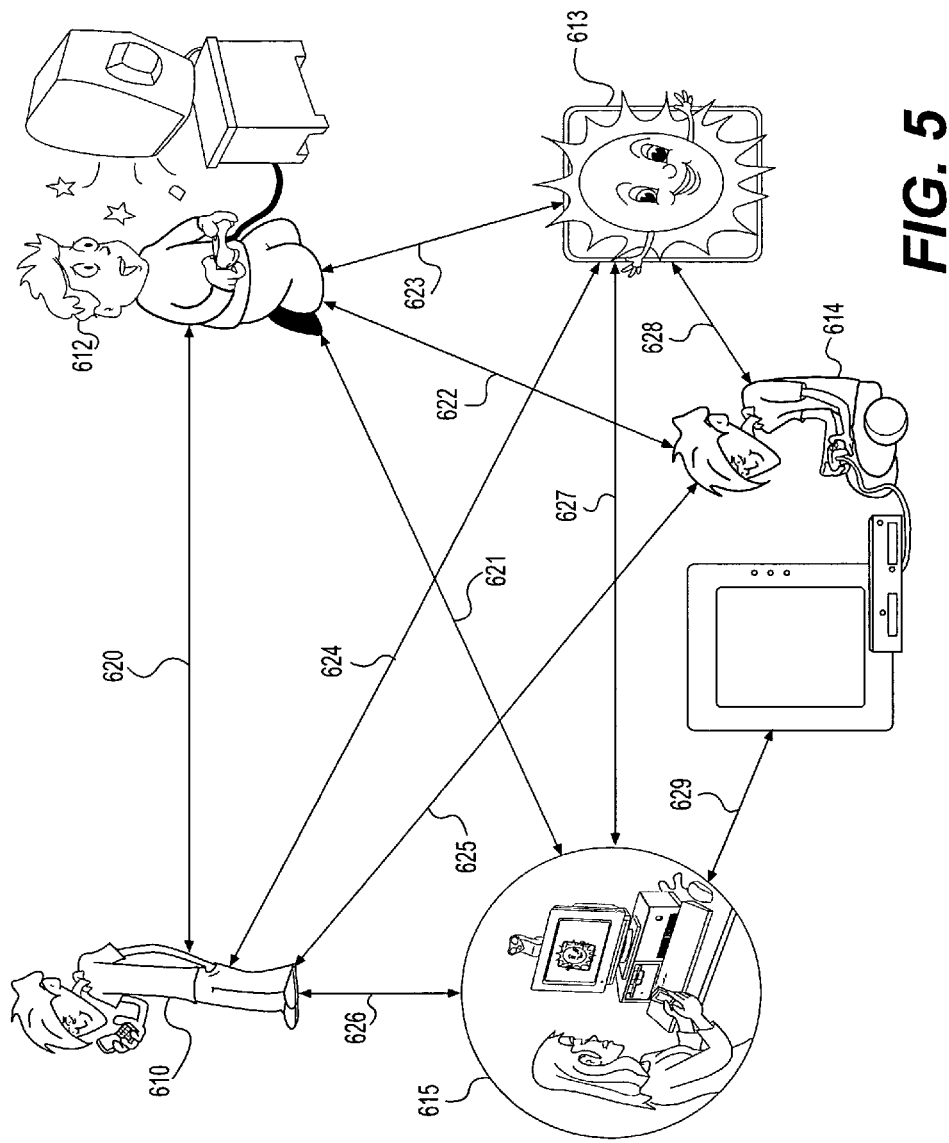
FIG. 5 depicts one embodiment of a system in operation to conduct a collaboration with individuals both inside and outside a virtual world over heterogeneous communication networks.

FIG. 5 depicts another embodiment in which additional individuals are participating in the collaboration established between individuals 612 and 614. As depicted and explained above in reference to FIG. 4, individuals 612 and 614 are virtual world individuals. Imaginary character 613 may be a character controlled by a virtual interactive program in the virtual world and, therefore, may also be referred to as a virtual world individual. Individuals 610 and 615 may be individuals in the real world (i.e., not represented by a character in the virtual world).

Although individuals 612 and 614 and imaginary character 613 are virtual world individuals and individuals 610 and 615 are real world individuals, the preferred methods and systems enable individuals 610, 612, 613, 614, and 615, or any subset thereof, to participate in a collaboration in the virtual world. Thus, FIG. 5 depicts how virtual world individuals (including imaginary characters) and real world individuals may collaborate in the virtual world.

Communication media 621, 622, 623, 627, 628, and 629 may be IP-based media, such as a broadband or a dial-up internet connection while communication media 620, 624, 625, and 626 may be non IP-based media. Communication media 620, 624, 625, and 626 may be media that have been routed through collaboration management server 30 (shown in FIGS. 2 and 3) to appropriate media exchange gateways. In addition, a user terminal operated by individual 610 may be a wireless mobile phone or a landline phone having voice and/or text capability only, whereas a user terminal operated by individual 615 may be a desktop computer equipped with voice, text, and video capability. Thus, a user terminal operated by individual 615 may have video send and receive capabilities and may be capable of conferencing with imaginary character 613 using full audio, video, and text abilities. On the other hand, a user terminal operated by individual 610 may have only voice and/or text ability, and, therefore, may be limited to using voice and/or text only via communication media 620, 624, 625, and 626.

In a preferred embodiment, imaginary character 613 may be controlled by a virtual interactive program in the virtual world to autonomously (i.e., without input from a user) establish collaboration channels with one or more of individuals 610, 612, 614, and 615. For example, the program represented by the imaginary character 613 may autonomously establish an IP or non-IP based channel with one or more of individuals 610, 612, 614, and 615 to inform the one or more individuals of an event created by individual 612 in the virtual world. Alternatively, imaginary character 613 may represent virtual world individual 612 or 614 and may be controlled or initiated, at least in part, to establish a collaboration channel with one or more other real world or virtual world individuals. For example, based on initiation instructions from virtual world individual 612, the program represented by the imaginary character 613 may establish an IP or non-IP based channel with one or more of individuals 610, 614, and 615 to inform the one or more individuals of an event created by individual 612 in the virtual world.

Figure 6:
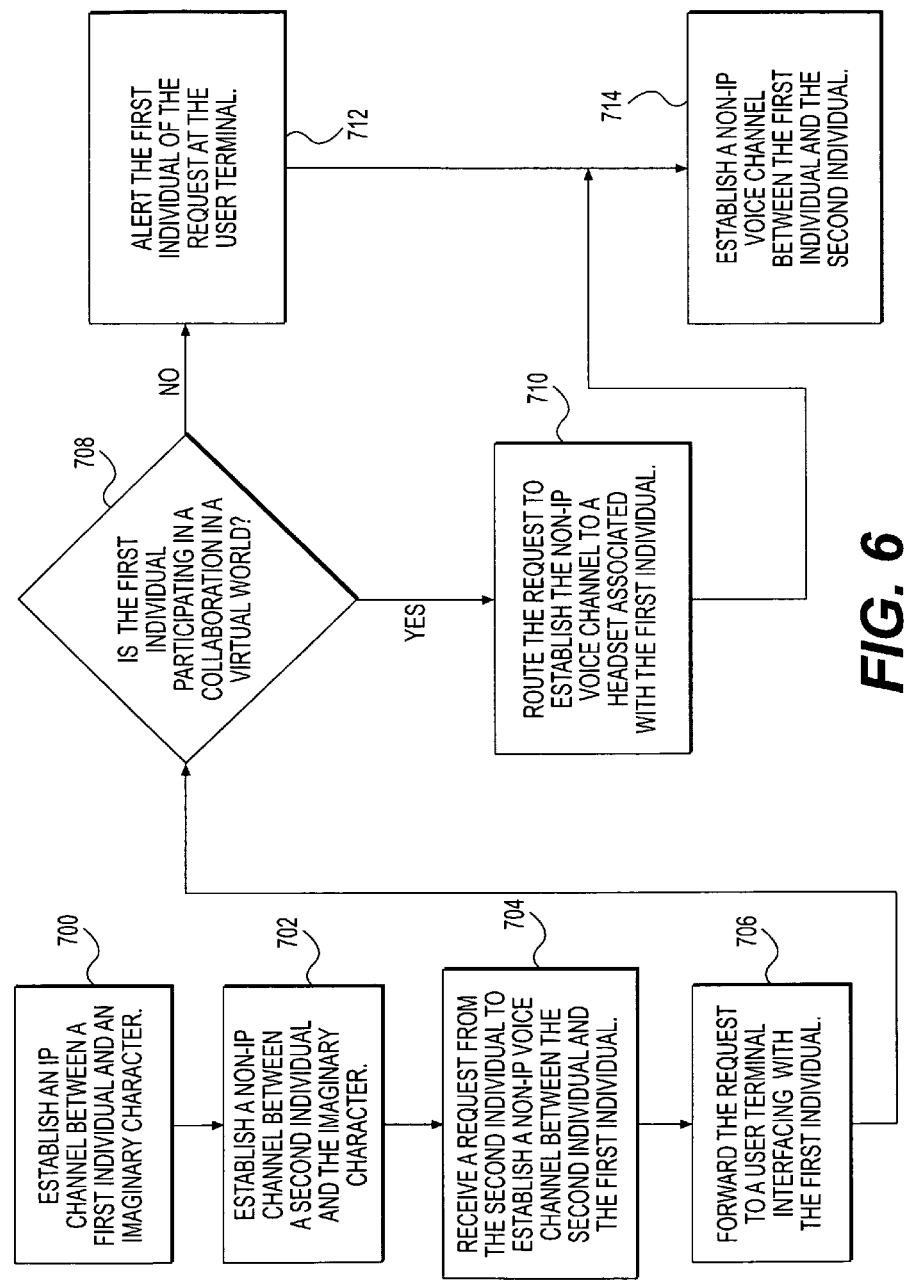
FIG. 6 is a flowchart depicting one implementation of the stages of a preferred collaboration method.

FIG. 6 is a flowchart depicting stages of an exemplary method for establishing a collaboration among individuals and an imaginary character in a virtual world, consistent with certain embodiments of the present invention. First, an internet protocol (IP) channel may be established between a first individual and a program represented by the imaginary character (stage 700). The IP channel may be initiated by either the first individual or the program represented by an imaginary character. Next, a non-IP channel may be established between a second individual and the program represented by the imaginary character (stage 702). For example, the first individual or the program represented by the imaginary character may send an invitation to the second individual to join the collaboration. Finally a non-IP channel may be established between the second individual and the first individual (stage 714).

In an exemplary embodiment consistent with the present invention, additional stages may be undertaken before the non-IP channel is established between the second individual and the first individual. For example, a request may be received from the second individual to establish a non-IP voice channel between the second individual and the first individual (stage 704). Next, the request may be forwarded to a user terminal interfacing with the first individual (stage 706). The user terminal may detect that the first individual is participating in the collaboration in the virtual world (stage 708) and may, therefore, route the request to establish the non-IP voice channel to a compatible output device used by the first individual (stage 710). Otherwise, the first individual may be alerted to the request by the user terminal (stage 712).

The preferred embodiments described herein enhance collaboration among one or more individuals in a virtual world (including imaginary characters) and among one or more individuals in the real world using text, audio, video, and/or images. The virtual world may be a game world, for example, associated with a multi-player game. As explained above, individuals or imaginary characters in the virtual world may invite real world individuals to participate in the game, thereby promoting rapid popularity and interest in the game.

Systems and methods for establishing a collaboration may establish an internet protocol channel between a first individual and a program represented by an imaginary character. A non-internet protocol channel may also be established between a second individual and the program represented by the imaginary character.

A system for establishing the collaboration may include a collaboration management server adapted to establish an internet protocol channel between a first individual and the program represented by the imaginary character. The system may also include a first gateway operably connected to the collaboration management server and adapted to establish a non-internet protocol channel between the second individual and the program represented by the imaginary character.

Moreover, establishing communication channels to connect a game's virtual world with the real world creates new possibilities for game developers. For example, a player may invite a friend in the real world to watch a battle in the game using a cellular phone with video streaming capabilities. Players may also call up teammates from within the game to invite them or challenge them to join the game. In addition, a game developer may design powers to be granted to players (i.e., individuals in the virtual world), such as telepathy, which may be accomplished with a phone call between players or between a player and a non-playing individual (e.g., an adviser). Another possible enhancement may include magic spells that allow players to view real world images of an actual player or of scenes and/or objects transmitted from a cellular phone with image-capturing capabilities. Another magic spell may include a capability for a player to call for help by initiating a collaboration channel (e.g., a voice, text, and/or video channel) with another player in the virtual game world or with an individual in the real world.

In one embodiment, an imaginary character (controlled autonomously or at least in part by a virtual world individual) may be designed to haunt individuals in the real world. For example, if a player has exited a virtual world game, the imaginary character may initiate a collaboration channel (e.g., a voice, text, and/or video channel) with the player and may thereby challenge the player to come back to the virtual world game.

Embodiments consistent with the invention may be implemented in various environments. Further, the processes described herein are not inherently related to any particular apparatus and may be implemented by any suitable combination of components. Moreover, various types of general purpose devices may be used in accordance with the teachings described herein. The exemplary systems and methods consistent with present invention described above are illustrative rather than restrictive. Different combinations of hardware, software, and firmware may be suitable for practicing embodiments of the present invention.

In the preceding specification various preferred embodiments have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A method for collaborating in a virtual world, comprising:
   establishing a first internet protocol channel between a first individual at a first terminal and a program, the program represented by an imaginary character in the virtual world, wherein the first terminal includes a gaming terminal used by the first individual to participate in the virtual world;
   establishing a second non-internet protocol channel between a second individual and the program represented by the imaginary character in the virtual world;
   receiving a request from the second individual to establish a third channel between the second individual and the first individual;
   determining, responsive to the request to establish the third channel, whether the first individual is participating in a collaboration with the imaginary character in the virtual world in which the imaginary character provides information to the first individual;
   responsive to determining that the first individual is participating in the collaboration in the virtual world, routing the request to establish the third channel to a first communication device connected to the gaming terminal used by the first individual to participate in the virtual world; and
   responsive to determining that the first individual is not participating in the collaboration in the virtual world, alerting, at the first terminal, the first individual of the request to establish the third channel.

2. The method of claim 1, wherein the program represented by the imaginary character is interactive.

3. The method of claim 1, wherein the program represented by the imaginary character is adapted to promote participation in the virtual world to the second individual.

4. The method of claim 1, wherein the second non-internet protocol channel is at least one of a PSTN voice channel, a CDMA voice channel, and a GSM voice channel.

5. The method of claim 1, wherein the second terminal includes at least one of a mobile telephone and a stationary telephone.

6. The method of claim 1, wherein the third channel is a non-internet protocol voice channel.

7. The method of claim 1, wherein the collaboration in the virtual world enhances participation in a game.

8. The method of claim 1, wherein the collaboration among the individuals and the imaginary character is initiated by the program represented by the imaginary character.

9. The method of claim 1, wherein the program represented by the imaginary character is controlled by the first individual to establish at least one of the first internet protocol channel and the second non-internet protocol channel.

10. The method of claim 1, wherein the program represented by the imaginary character autonomously establishes at least one of the first internet protocol channel and the second non-internet protocol channel.

11. A system for collaborating in a virtual world, comprising:
    a collaboration management server adapted to establish a first internet protocol channel between a first individual at a first terminal and a program, the program represented by an imaginary character in the virtual world, wherein the first terminal includes a gaming terminal used by the first individual to participate in the virtual world;
    a gateway operably connected to the collaboration management server and adapted to:
      establish a second non-internet protocol channel between a second individual and the program represented by the imaginary character in the virtual world;
      receive a request from the second individual to establish a third channel between the second individual and the first individual;
      determine, responsive to the request to establish the third channel, whether the first individual is participating in a collaboration with the imaginary character in the virtual world in which the imaginary character provides information to the first individual;
      responsive to a determination that the first individual is participating in the collaboration in the virtual world, route the request to establish the third channel to a first communication device connected to the gaming terminal used by the first individual to participate in the virtual world; and
      responsive to a determination that the first individual is not participating in the collaboration in the virtual world, alert, at the first terminal, the first individual of the request to establish the third channel.

12. The system of claim 11, wherein the program represented by the imaginary character is interactive.

13. The system of claim 11, wherein the program represented by the imaginary character is adapted to promote participation in the collaboration to the second individual.

14. The system of claim 11, wherein the second non-internet protocol channel is at least one of a PSTN voice channel, a CDMA voice channel, and a GSM voice channel.

15. The system of claim 11, wherein the second terminal includes at least one of a mobile telephone and a stationary telephone.

16. The system of claim 11, wherein the third channel is a non-internet protocol voice channel.

17. The system of claim 11, wherein the collaboration in the virtual world enhances participation in a game.

18. The system of claim 11, wherein the collaboration among the individuals and the imaginary character is initiated by the program represented by the imaginary character.

19. The system of claim 11, wherein the program represented by the imaginary character is adapted to receive instructions from the first individual to establish at least one of the first internet protocol channel and the second non-internet protocol channel.

20. The system of claim 11, wherein the program represented by the imaginary character is adapted to autonomously establish at least one of the first internet protocol channel and the second non-internet protocol channel.

* * * * *